US010077742B2

(12) United States Patent
Le Gonidec et al.

(10) Patent No.: US 10,077,742 B2
(45) Date of Patent: Sep. 18, 2018

(54) TECHNICAL TRIAL METHOD

(71) Applicant: SAFRAN AIRCRAFT ENGINES, Paris (FR)

(72) Inventors: Serge Le Gonidec, Vernon (FR); Sebastien Reichstadt, Asnieres/Seine (FR); Virgil Musta, Vernon (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 59 days.

(21) Appl. No.: 15/034,662

(22) PCT Filed: Oct. 24, 2014

(86) PCT No.: PCT/FR2014/052713
§ 371 (c)(1),
(2) Date: May 5, 2016

(87) PCT Pub. No.: WO2015/067872
PCT Pub. Date: May 14, 2015

(65) Prior Publication Data
US 2016/0281642 A1 Sep. 29, 2016

(30) Foreign Application Priority Data

Nov. 5, 2013 (FR) ..................... 13 60840

(51) Int. Cl.
*F02C 9/00* (2006.01)
*F02K 9/00* (2006.01)
(Continued)

(52) U.S. Cl.
CPC .................. *F02K 9/96* (2013.01); *F02C 9/00* (2013.01); *F02K 9/00* (2013.01); *G01M 15/14* (2013.01); *F05D 2260/83* (2013.01)

(58) Field of Classification Search
CPC .... F02C 9/00; F02K 9/00; F02K 9/96; G01M 15/14; G05D 2260/83
See application file for complete search history.

(56) References Cited

U.S. PATENT DOCUMENTS

2004/0221978 A1* 11/2004 Tran ..................... D21G 9/0027
162/198
2011/0133106 A1* 6/2011 Grossmann ........... F02D 11/105
251/129.12

(Continued)

FOREIGN PATENT DOCUMENTS

| FR | 2 939 170 A1 | 6/2010 |
| FR | 2 965 915 A1 | 4/2012 |
| FR | 2 966 928 A1 | 5/2012 |

OTHER PUBLICATIONS

International Search Report dated Mar. 25, 2015 in PCT/FR2014/052713 (with English language translation).

*Primary Examiner* — Bryan Bui
(74) *Attorney, Agent, or Firm* — Oblon, McClelland, Maier & Neustadt, L.L.P.

(57) ABSTRACT

A technical test method for evaluating at least one operating parameter of a device over a sequence of a plurality of operating stages, each stage corresponding to a stable value of at least one operating setpoint of the device. The method including at least sampling values of the at least one operating parameter over time, filtering the sampled values in order to obtain a filtered signal for each operating parameter, calculating the variance of the sampled values for each operating parameter in a sampling window during the operating stage, calculating the absolute value of the time derivative of the filtered signal for each operating parameter, and changing the value of the at least one operating setpoint when, for each operating parameter, the variance of the sampled values and the absolute value of the time derivative (Continued)

of the filtered signal are less than respective predetermined lower thresholds.

9 Claims, 4 Drawing Sheets

(51) Int. Cl.
*F02K 9/96* (2006.01)
*G01M 15/14* (2006.01)

(56) References Cited

U.S. PATENT DOCUMENTS

2011/0288836 A1 11/2011 Lacaille et al.
2012/0109486 A1 5/2012 Ecoutin et al.
2013/0211768 A1 8/2013 Gerez et al.

* cited by examiner

TECHNICAL TRIAL METHOD

BACKGROUND OF THE INVENTION

The present invention relates to a technical test method for testing a device to evaluate at least one operating parameter of the device over a sequence of a plurality of operating stages, each stage corresponding to a stable value of at least one operating setpoint of the device.

In the field of technical testing, it is common practice to test devices at a plurality of different operating rates that are to be encountered during use of the device being subjected to the technical test, with this being for the purpose of characterizing the entire operating envelope of the device as completely as possible. Typically, during testing, this is done by following a sequence comprising a plurality of operating stages, with each operating stage being maintained for a predetermined duration that is considered as being sufficient for guaranteeing the quality of information about operating parameters of the device as obtained over the duration of this stage.

Nevertheless, running such a sequence of operating stages of predetermined duration can result in tests presenting an overall duration that is considerable. Unfortunately, and mainly for economic reasons, it is desirable to limit the overall duration of testing. In addition, adjusting the individual duration of each operating stage would make it possible to test a larger number of operating setpoint values, thereby enabling the operating envelope of the device subjected to testing to be characterized more completely.

OBJECT AND SUMMARY OF THE INVENTION

The test method described in the present disclosure seeks to remedy those drawbacks.

In particular, this disclosure seeks to propose a technical test method for evaluating at least one operating parameter of a device over a sequence of a plurality of operating stages, which method makes it possible to reduce the overall duration of testing and/or to increase the number of operating stages in said sequence, while maintaining the quality of the information about at least one operating parameter of the device as collected during such testing.

In at least one embodiment, this object is achieved by the fact that the method comprises at least the following steps for each operating stage:
sampling values of the at least one operating parameter of the device over time;
filtering the sampled values in order to obtain a filtered signal for each operating parameter;
calculating the variance of the sampled values for each operating parameter in a sampling window during said operating stage;
calculating the absolute value of the time derivative of the filtered signal for each operating parameter; and
changing the value of said at least one operating setpoint when, for each operating parameter, the variance of the sampled values and the absolute value of the time derivative of the filtered signal are less than respective predetermined lower thresholds over at least a predetermined minimum duration.

The variance of the sampled values and the time derivative of the filtered signal are indicative of the stability of the sampled values. Consequently, when the values of this variance and the absolute value of this derivative pass below their respective lower thresholds, it can be considered that the values sampled during the operating stage are sufficiently stable to be representative of the steady operation of the device with the operating setpoint corresponding to this operating stage. It is thus possible to bring this operating stage to an end and pass on to the next, with the value sampled for each operating parameter and/or the corresponding filtered signal being suitable for use in calculating a mathematical expectation representing the behavior of the corresponding operating parameter for the operating setpoint corresponding to this operating stage.

Nevertheless, it is possible to envisage that the sampled values do not stabilize sufficiently, even after a prolonged period in this operating stage. In order to avoid the operating setpoint thus being maintained indefinitely, without moving on to the following operating stage and thus without completing the technical test of the device, it is possible to change the value of at least one operating setpoint in order to move on to the following stage after a predetermined time period, even if, for at least one operating parameter, the variance of the sampled values and/or the absolute value of the time derivative of the filtered signal are still not below their respective lower thresholds.

The values of at least one operating parameter of the device may in particular be sampled at regular time intervals. In order to ensure that the sampled values are filtered effectively, the sampling may be performed by at least one Kalman filter, although other types of filter may be envisaged as alternatives or in addition thereto.

For certain values of at least one operating setpoint, the operating parameters may be found to be clearly too unstable to enable any meaningful mathematical expectation to be calculated, independently of the duration of the operating stage. In order to identify such a situation quickly and interrupt the operating stage so as to pass on to the next stage, the test method may further comprise the following steps:
calculating the measure of skewness of the sampled values for each operating parameter in said sampling window;
calculating the variance of the time derivative of the filtered signal for each operating parameter; and
changing the value of said operating setpoint if the measure of skewness of the sampled values for at least one operating parameter exceeds a predetermined upper threshold and/or the variances of the sample values and the time derivative of the filtered signal for at least one operating parameter exceed respective predetermined upper thresholds.

In order to obtain a reaction quickly once the operating parameters X have stabilized, the sampling window may in particular be a moving window, thus corresponding to the n most recent samples taken in this operating stage. Nevertheless, as an alternative, it would also be possible for the sampling window not to be a moving window, but to have a start set at the beginning of the operating stage, or after an initial interval measured from the beginning of the operating stage.

This test method may be used in particular for testing engines, more particularly liquid-propellant rocket-engines, and specifically liquid-propellant rocket-engines including turbopump feed systems. Nevertheless, the test method may also be used for testing other types of device, and in particular turbine engines.

The present invention also relates to an electronic control unit with at least one data input for receiving at least one operating parameter of a device and at least one data output for transmitting at least one operating setpoint to said device. In at least one embodiment, the electronic control unit is configured to:

- order an operating stage of the device corresponding to a stable value of said operating setpoint;
- sample values of the at least one operating parameter of the device over time;
- filter the sampled values in order to obtain a filtered signal for each operating parameter;
- calculate the variance of the sampled values for each operating parameter from the beginning of said operating stage;
- calculate the absolute value of the time derivative of the filtered signal for each operating parameter; and
- order a new operating stage by changing the value of said at least one operating setpoint when, for each operating parameter, said variance of the sampled values and the absolute value of the time derivative of the filtered signal are less than respective predetermined lower thresholds over at least a predetermined minimum duration.

Finally, the present disclosure also relates to a data medium including a set of instructions for performing the above-mentioned test method. The term "data medium" designates any data storage device capable of being read by a computer system. Such a data medium may in particular be a magnetic data storage device, such as a magnetic disk or tape, or an optical data storage device such as an optical disk, or an electronic data storage device, such as a volatile or non-volatile electronic memory.

BRIEF DESCRIPTION OF THE DRAWINGS

The invention can be well understood and its advantages appear better on reading the following detailed description of an implementation shown by way of non-limiting example. The description refers to the accompanying drawings, in which.

DETAILED DESCRIPTION OF THE INVENTION

Figure 1:
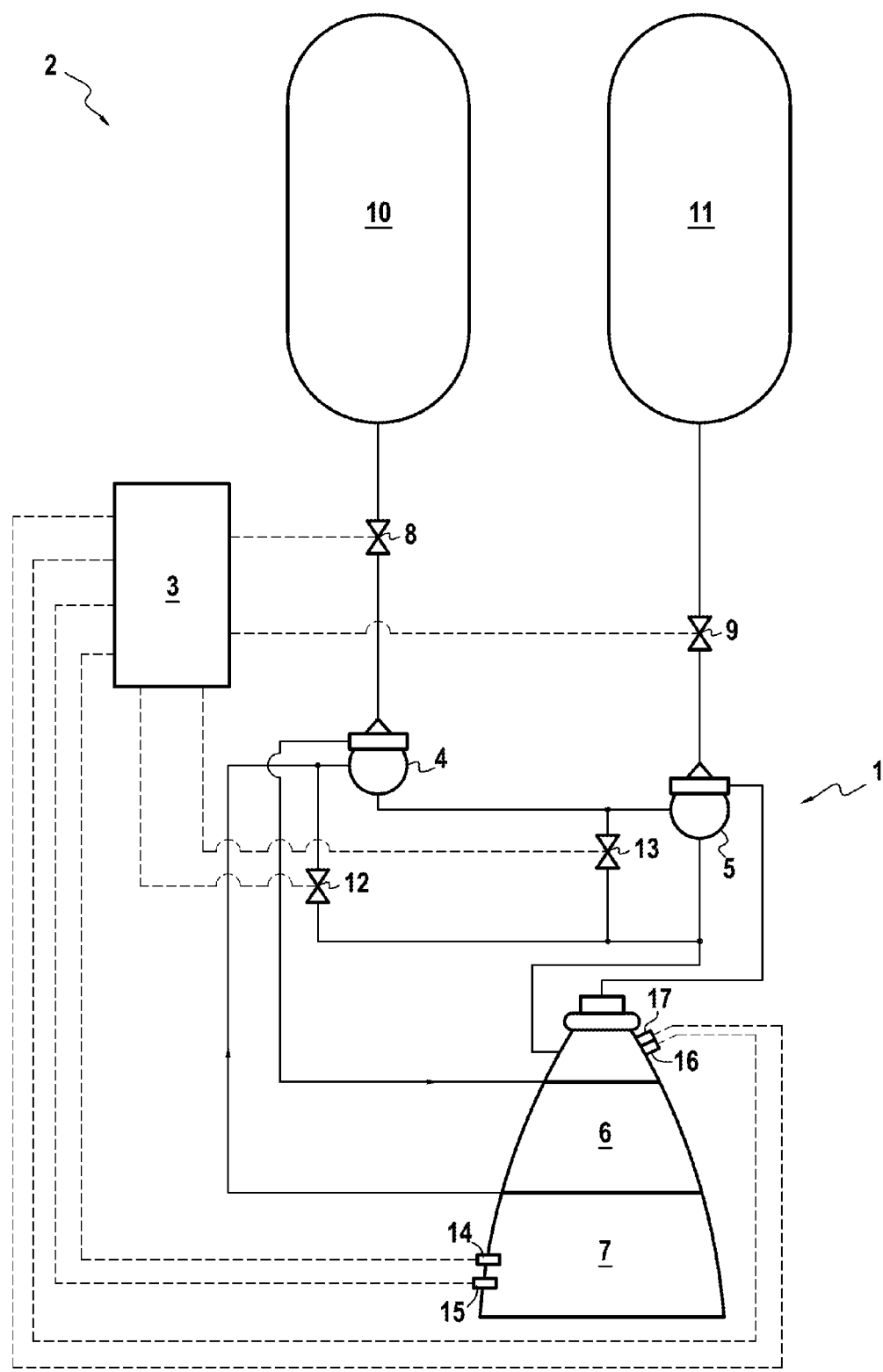
FIG. 1 is a diagram showing a liquid-propellant rocket-engine that is fed by turbopumps on a test bench including an electronic control unit in an embodiment of the present invention.

FIG. 1 shows a liquid-propellant rocket-engine 1 that is fed by turbopumps, the engine being installed on a test bench 2 in which it is connected to an electronic control unit 3 for performing tests using a profile comprising a sequence of a plurality of stages of operation.

In the embodiment shown, the rocket engine 1 is a rocket engine of the "expansion cycle" type, in which the turbopumps 4 and 5 are actuated by one of the propellants after passing through a regenerative heat exchanger 6 adjacent to the walls of the propulsion chamber 7 of the rocket engine 1. Feed valves 8 and 9 are interposed between the tanks 10 and 11 containing the propellants and the corresponding turbopumps 4 and 5, and bypass valves 12 and 13 enable these turbopumps 4 and 5 to be bypassed at least in part by the propellant heated by the heat exchanger 6. Nevertheless, the invention is not limited in any way to testing such rocket engines, and it may equally well be applied to testing other types of engine and indeed other types of device.

In the embodiment shown, the operation of the rocket engine 1 can be controlled by means of the feed valves 8 and 9 and the bypass valves 12 and 13. Each of these valves is connected for this purpose to the electronic control unit 3 in order to receive operating setpoints. The test bench 2 also has sensors, such as for example temperature and pressure sensors 14 and 15 in the propulsion chamber 7, and thrust and vibration sensors 16 and 17 in the supports of the rocket engine 1. These sensors 14, 15, 16, 17 are also connected to the electronic control unit 3 in order to transmit operating parameters of the rocket engine 1 thereto. This set of operating parameters X may include a first parameter A, a second parameter B, and so on.

In the test bench 2, the rocket engine 1 is to be subjected to technical tests comprising a sequence of operating stages in order to evaluate the operating parameters X of the rocket engine 1 as picked up during each of these operating stages. Each operating stage in this sequence corresponds to a set of stable setpoint values for the operation of the rocket engine 1 and seeks to reproduce operating points that are pertinent for normal utilization of the rocket engine 1. These operating parameters X serve to characterize the rocket engine 1 in order to adjust it prior to flight.

Figure 2:
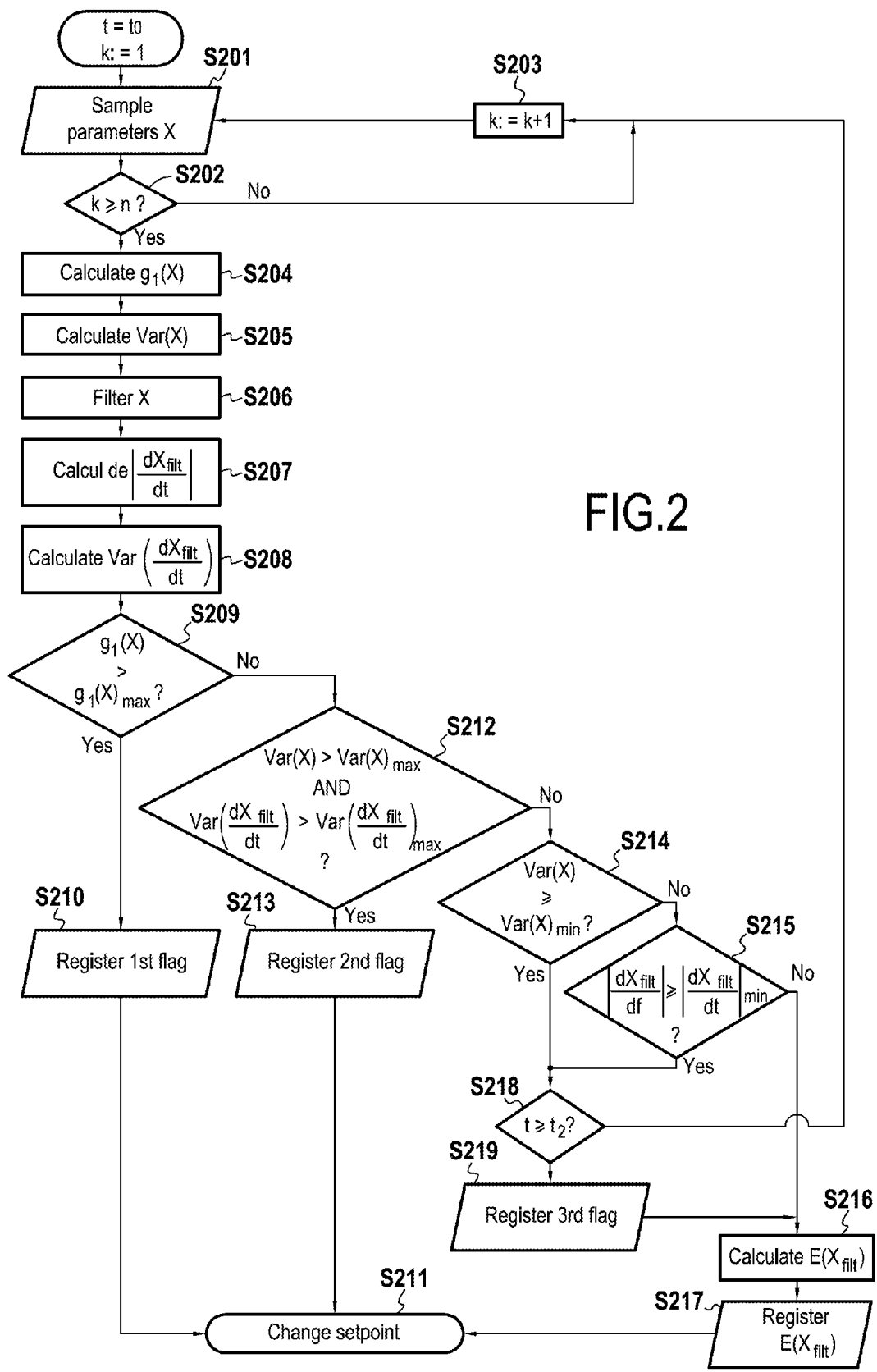
FIG. 2 is a diagram of the method showing a test method in an implementation of the invention.

In order to be able to collect values representative of the operating parameters X of a rocket engine 1 during such a test, each operating stage needs to have a duration that is sufficient to reach steady or quasi-steady operation of the rocket engine 1. Simultaneously, excessive durations for the operating stages, and thus for the test, present drawbacks in particular in terms of cost. A test method enabling the duration of each stage to be controlled in order to obtain representative values for the operating parameters X of a rocket engine 1 without excessively prolonging the duration of each stage is shown diagrammatically in FIG. 2.

In this method, a counter k is initialized with a value 1 at the beginning of each operating stage in a step S200. The counter k may be initialized after waiting a predetermined time $t_0$ in order to avoid an initial transition stage in the operating parameters X picked up by the sensors 14 to 17. Thereafter, values $X_k$ of these operating parameters X are sampled by the electronic control unit 3 in a sampling step S201.

In the following step S202, the electronic control unit 3 verifies whether the counter k has reached at least a predetermined number n. So long as n has not been reached, the electronic control unit 3 returns to the sampling step S201, passing via a step S203 in which unity is added of the counter k. This return loop may be timed, so that the sampling of the operating parameters X takes place at regular intervals over time. Once the counter k has reached the number n, the electronic control unit 3 passes to a step S204, in which the measure of skewness $g_1(X)$ of the succession of the n most recently sampled values $X_{k-n+1}$ to $X_k$ for each operating parameter X is calculated using the following formula:

$$g_1(X) = \frac{\frac{1}{n}\sum_{i=k-n+1}^{k}\Delta X_i^3}{\left(\frac{1}{n}\sum_{i=k-n+1}^{k}\Delta X_i^2\right)^{3/2}}$$

where $\Delta X_i$ represents the difference between each sample value $X_i$ in this moving window of n samples relative to the mean of these n most recently sampled values $X_{k-n+1}$ to $X_k$ for the corresponding operating parameter X. This may be expressed by the following formula:

$$\Delta X_i = X_i - \frac{1}{n}\sum_{j=k-n+1}^{k} X_j$$

In a following step S205, the electronic control unit 3 calculates the variance Var(X) of the n most recently sampled values $X_{k-n+1}$ to $X_k$ using the formula:

$$\text{Var}(X) = \frac{\sum_{i=k-n+1}^{k}(X_i)^2}{n} - \left(\frac{\sum_{i=k-n+1}^{k} X_i}{n}\right)^2$$

In other words, this variance Var(X) of each parameter X is equal to the mean of the squares of the n most recently sampled values $X_{k-n+1}$ to $X_k$, minus the square of the mean of the n sampled values $X_{k-n+1}$ to $X_k$.

In a following step S206, the signal corresponding to each parameter X is filtered by the electronic control unit 3, e.g. by applying a Kalman filter, although other types of filter could be envisaged in addition thereto or in the alternative, so as to obtain a filtered signal $X_{filt}$. Thereafter, in a step S207, the electronic control unit calculates the absolute value of the time derivative $dX_{filt}/dt$ of the filtered signal $X_{filt}$, and in a step S208, it calculates the variance Var($dX_{filt}/dt$) of this time derivative $dX_{filt}/dt$ from the beginning of the operating stage. A single filter, e.g. a Kalman filter, could provide the values of the time derivative $dX_{filt}/dt$ and of the variances Var(X) and Var($dX_{filt}/dt$).

On the basis of the values of the measure of skewness $g_1(X)$, of the variance Var(X), of the absolute value, and of the variance of the time derivative $dX_{filt}/dt$ as calculated in these steps S204 to S208 for each parameter X in the electronic control unit 3 then proceeds to analyze the qualities of the signals corresponding to each parameter X in the time window. Thus, in a step S209, the measure of skewness $g_1(X)$ for each parameter X is compared with a corresponding upper threshold $g_1(X)_{max}$. If one of these measures of skewness $g_1(X)$ is greater than its threshold $g_1(X)_{max}$, that indicates excessive skewness in the n most recently sampled values $X_{k-n+1}$ to $X_k$. Under such circumstances, the electronic control unit 3 issues a first alert flag concerning this skewness in a step S210. Optionally, the operating stage can then be interrupted immediately in the manner shown, with the electronic control unit 3 moving on directly to a step S211 in which the operating setpoints transmitted to the rocket engine 1 are changed in order to move on to the following stage, or in order to stop the test entirely if the current operating stage is the last intended stage or if certain other conditions are satisfied, e.g. indicating a persistent lack of reliability in the values picked up for the operating parameters X. Nevertheless, and alternatively, the operating stage could be maintained for at least a predetermined duration, e.g. such as a maximum duration $t_2$ for the operating stage, with values continuing to be collected for the other operating parameters X.

If the values for the measures of skewness $g_1(X)$ corresponding to each of the parameters X remain less than or equal to their respective upper thresholds $g_1(X)_{max}$, then the electronic control unit 3 can move on to a step S212, in which the variance Var(X) of each parameter X and the variance Var($dX_{filt}/dt$) of the time derivative $dX_{filt}/dt$ of the filtered signal $X_{filt}$ corresponding to each parameter X are compared with respective predetermined upper thresholds Var(X)$_{max}$ and Var($dX_{filt}/dt$)$_{max}$. If at least one of these variances Var(X) and Var($dX_{filt}/dt$) is greater than its respective upper threshold, that likewise means that the quality of the n most recently sampled values to $X_{k-n+1}$ to $X_k$ is defective. The electronic control unit 3 can then issue a second alert flag in a step S213, relating to drift or excessive noise being indicated by these variances Var(X) and Var($dX_{filt}/dt$). As in the step S210, the operating stage may then be interrupted immediately as shown, with the electronic control unit 3 also passing on directly to the step S211 in which the operating setpoints transmitted to the rocket engine 1 are changed in order to pass on to the following stage, or in order to stop the test entirely if the current operating stage is the last intended stage. Nevertheless, as an alternative, the operating stage could be maintained for at least a predetermined duration, e.g. such as a maximum duration $t_2$ for the operating stage, in order to continue collecting values for the other operating parameters X.

Nevertheless, if the values of the variances Var(X) and Var($dX_{filt}/dt$) remain less than or equal to their respective maximum thresholds Var(X)$_{max}$ and Var($dX_{filt}/dt$)$_{max}$, then the operating stage may be maintained in normal manner without issuing said second alert flag. In a step S214, the variance Var(X) of each operating parameter X is compared with a respective predetermined lower threshold Var(X)$_{min}$. If the variance Var(X) of at least one of the operating parameters X in the moving window of the n most recently sampled values remains equal to or greater than the respective lower threshold Var(X)$_{min}$, and if a predetermined maximum duration $t_2$ of the current operating stage has not been reached, then the electronic control unit 3 will return to the sampling step S201, passing via the step S203, where unity is added to the counter k. This return loop may also be timed, so that the sampling of the operating parameters X is performed at regular time intervals.

In contrast, if the variances Var(X) of all of the operating parameters X in the moving window of the n most recently sampled values are less than their respective lower thresholds Var(X)$_{min}$, then the electronic control unit 3 passes on to a step S215 in which the absolute value of the time derivative $dX_{filt}/dt$ of the filtered signal $X_{filt}$ corresponding to each operating parameter X is compared with a respective lower threshold $|dX_{filt}/dt|_{min}$. If the absolute value of the time derivative $dX_{filt}/dt$ corresponding to at least one of the operating parameters X remains greater than or equal to the respective lower threshold $|dX_{filt}/dt|_{min}$, and if the predetermined maximum duration $t_2$ of the current operating stage has not been reached, then the electronic control unit 3 also returns to the sampling step S201 by passing via the step S203. This return loop may also be timed so as to ensure that the operating parameters X are sampled regularly in time.

In contrast, if not only the variances Var(X) of all of the operating parameters X are less than their respective lower thresholds Var(X)$_{min}$, but also the absolute values of the time derivatives $dX_{filt}/dt$ corresponding to all of the operating parameters X are likewise less than their respective lower thresholds $|dX_{filt}/dt|_{min}$, it can be considered that the operating parameters X are sufficiently stable for the mathematical expectations E($X_{filt}$) calculated on the basis of the filtered signals $X_{filt}$ corresponding to the operating parameters X in the moving window of the n most recently sampled values to be representative of stationary operation of the rocket engine 1 with the corresponding operating setpoints. Consequently, in a following step S216, these mathematical expectations E($X_{filt}$) are calculated by the electronic control unit 3 so as to be stored subsequently in a step S217, possibly together with the variances Var(X) and Var($dX_{filt}/dt$) and the measures of skewness $g_1(X)$ of the moving window of the n most recently sampled values, prior to proceeding to the step S211 of changing the values of the operating setpoints transmitted to the rocket engine 1 in order to move on to a new operating stage, or possibly in order to finalize the sequence of stages. Although in the implementation shown the passage to steps S216 and S217 takes place immediately once the conditions considered in the preceding steps S214 and S215 are satisfied, it is possible to envisage conditioning such passage to the steps S216 and S217 on the variances Var(X) and the time derivatives $dX_{filt}/dt$ all remaining below their respective lower thresholds Var(X)$_{min}$ and $|dX_{filt}/dt|_{min}$ for a predetermined period of time $t_1$ comprising a plurality of sampling cycles. In addition, in order to avoid the operating stage being maintained indefinitely if the operating parameters X do not become sufficiently stabilized to satisfy the conditions of steps S214 and S215, the method shown also includes, upstream from step S203, a step S218 in which the electronic control unit 3 monitors whether the operating parameter has been maintained for a period of time longer than the predetermined duration $t_2$. If this duration $t_2$ has indeed been exceeded, then the return loop via step S203 is not performed. Under such circumstances, the electronic control unit 3 issues a third alert flag in a step S219, prior to finalizing the operating stage by passing via the steps S216 and S217, and passing to the following operating stage or finalizing the technical test.

Figure 3A:
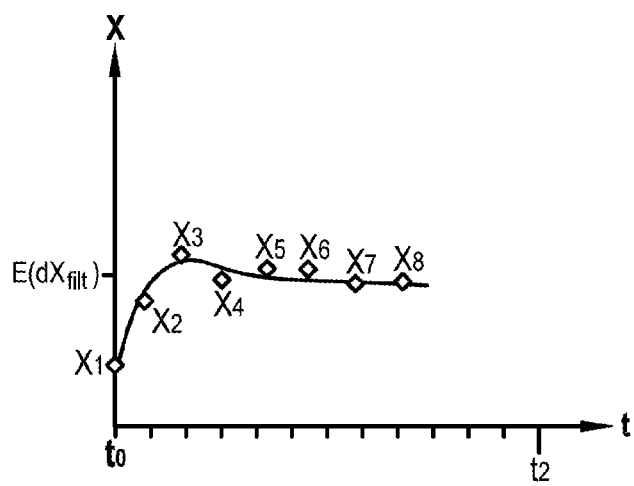
FIG. 3A is a graph showing the variation both of an operating parameter of the FIG. 1 rocket engine and also of a filtered signal corresponding to this parameter, during an operating stage in a test of the rocket engine when this operating parameter stabilizes before a predetermined maximum duration for the operating stage.

FIG. 3A shows an example of the operation of the test method. Starting from the beginning of the operating stage shown, values from the set of operating parameters X are sampled regularly in time. FIG. 3A shows how the sampled values vary for one of these operating parameters X, and also how a filtered signal $X_{filt}$ resulting from the processing of the sampled values for this parameter X in the filtering step S206 vary. In the example shown, the sampled values of this parameter X stabilize quite quickly at a steady or quasi-steady level after the beginning of the operating stage. There is no need to continue with this operating stage until the end of its maximum duration $t_2$ in order to obtain a mathematical expectation E($X_{filt}$) that is representative of this parameter X with the operating setpoints corresponding to this operating stage. If this is also true for the other operating parameters X, the control unit 3 can perform the steps S216 and S217 in order to finalize this operating stage and move on to the next.

Figure 3B:
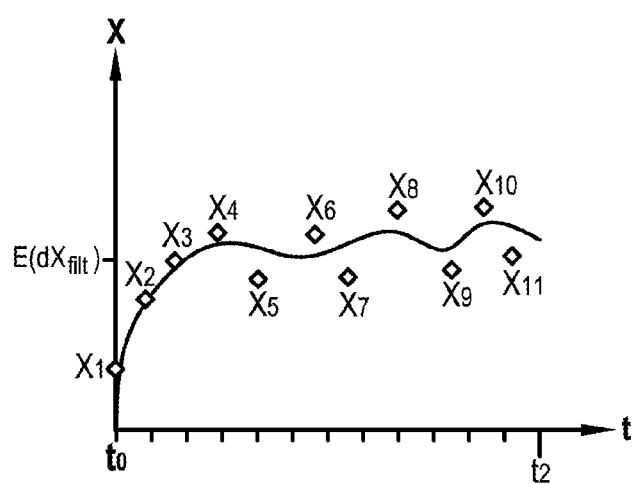
FIG. 3B is a graph showing the variation of the same parameter and of the corresponding filtered signal when the operating parameter does not stabilize sufficiently before said maximum duration for the operating stage.

In contrast, FIG. 3B shows an example of operation in which the parameter X shown does not stabilize sufficiently to satisfy the conditions of steps S214 and S215 so as to finalize the operating stage before the end of the period $t_2$. Consequently, and even if the other operating parameters X stabilize sooner, the electronic control unit 3 does not move on to the following stage until the maximum duration $t_2$ has elapsed, and in so doing it issues the above-mentioned third alert flag.

Figure 3C:
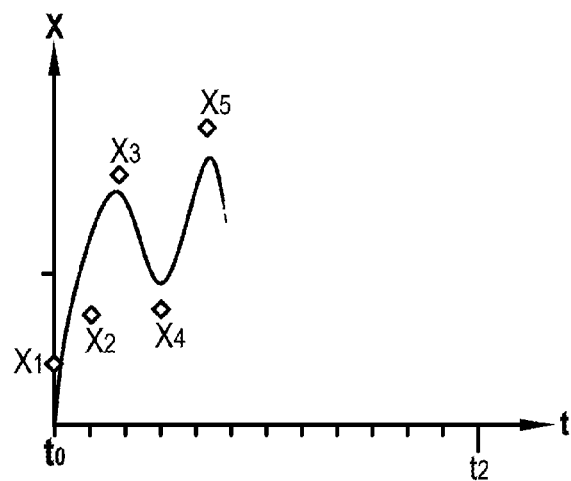
FIG. 3C is a graph showing the variation of the same parameter and of the corresponding filtered signal when the operating stage is interrupted because of excessive initial instability of the parameter.

Finally, FIG. 3C shows a situation in which the sampled values of the illustrated parameter X appear not to present sufficient quality. Under such circumstances, the conditions verified in steps S209 or S212 for continuing sampling are not satisfied, and the operating stage is interrupted after issuing the above-mentioned first and second alert flags. If this insufficient quality is indicative of a persistent lack of reliability in the values picked up for the operating parameters X, e.g. if the same alert flags were issued during the preceding stages, it is possible to envisage interrupting not only this operating stage, but also the test as a whole.

Figure 4A:
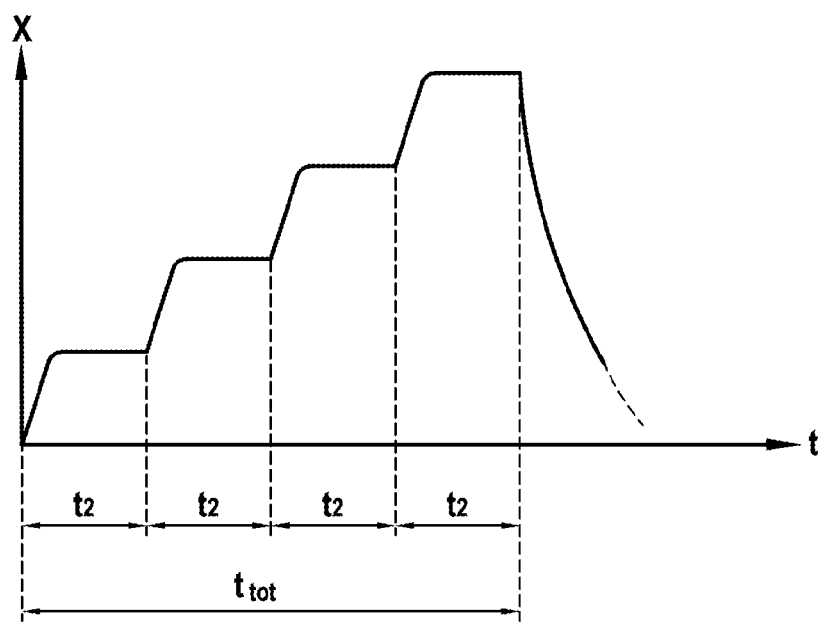
FIG. 4A is a graph showing variation of the same parameter during a technical test comprising a plurality of operating stages of fixed duration.
Figure 4B:
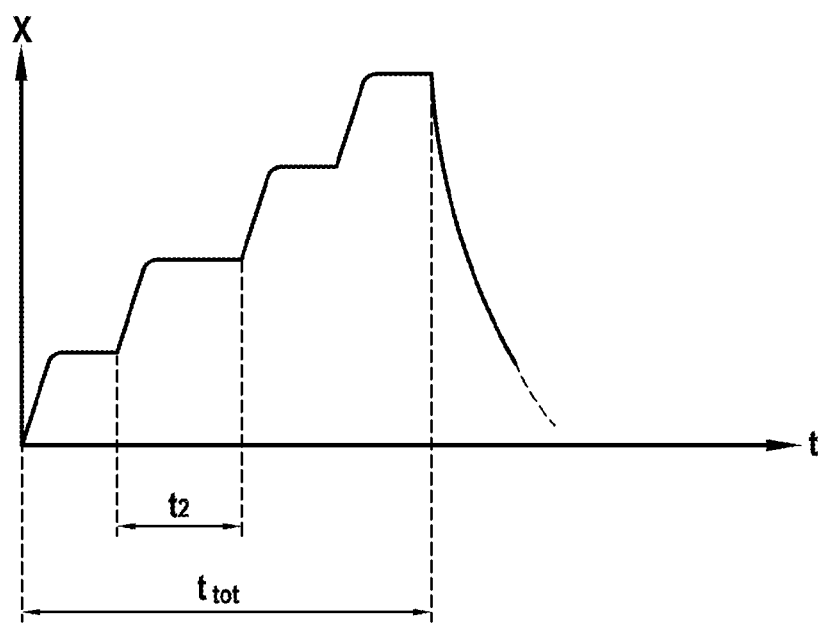
FIG. 4B is a graph showing the variation of the same parameter during a technical test comprising a plurality of operating stages of durations that vary under control in an implementation of the present invention.

FIG. 4A shows how the parameter X varies in a technical test comprising a plurality of operating stages, in which each operating stage is maintained for its maximum duration $t_2$. In contrast, FIG. 4B shows how the same parameter X varies in a technical test performed while performing an implementation of the invention, and in which only the second stage reaches its maximum duration $t_2$, whereas the other stages are finalized before reaching the maximum duration $t_2$, as in the examples shown in FIGS. 3A and 3C. Consequently, this technical test may have a total duration $t_{tot}$ that is substantially shorter than the total duration of the test shown in FIG. 4A, while providing equivalent data for the same operating stages.

The electronic control unit 3 may be a generic computer, programmed with a suitable set of instructions. The results of the test may be evaluated in deferred time, on the basis of parameters sampled and filtered during the test, and/or on the basis of the mathematical expectations calculated during the test.

Although the present invention is described with reference to a specific implementation, it is clear that various modifications and changes may be made on these implementations without going beyond the general ambit of the invention as defined by the claims. In addition, individual characteristics of the various implementations mentioned may be combined in additional implementations. Consequently, the description and the drawings should be considered in a sense that is illustrative rather than restrictive.

The invention claimed is:

1. A technical test method for evaluating at least one operating parameter of a device over a sequence of a plurality of operating stages, each operating stage corresponding to a stable value of at least one operating setpoint of the device, the method comprising at least the following steps for each operating stage:
   sampling values of the at least one operating parameter over time;
   calculating a measure of skewness of the sampled values for each operating parameter in a sampling window;
   calculating a variance of the sampled values for each operating parameter in said sampling window during said operating stage;

filtering the sampled values in order to obtain a filtered signal in said sampling window for each operating parameter;

calculating an absolute value of a time derivative of the filtered signal in said sampling window for each operating parameter;

calculating a variance of the time derivative of the filtered signal in said sampling window for each operating parameter; and changing a value of said at least one operating setpoint when, for each operating parameter, at least one of the following conditions is satisfied:

the measure of skewness of the sampled values for the at least one operating parameter exceeds a predetermined upper threshold, the variance of the sampled values and the variance of the time derivative of the filtered signal for at least one operating parameter exceed respective predetermined upper thresholds, and the variance of the sampled values and the absolute value of the time derivative of the filtered signal are less than respective predetermined lower thresholds over a predetermined time duration.

2. The technical test method according to claim 1, wherein the value of the operating setpoint is changed after the predetermined time period is exceeded, even if, for at least one operating parameter, at least one of the variance of the sampled values and the absolute value of the time derivative of the filtered value is greater than or equal to the respective predetermined lower thresholds.

3. The technical test method according to claim 1, wherein the values of the at least one operating parameter are sampled at regular time intervals.

4. The technical test method according to claim 1, wherein said filtering of the sampled values is performed by at least one Kalman filter.

5. The technical test method according to claim 1, wherein said sampling window is a moving window.

6. The technical test method according to claim 1, wherein the device is an engine.

7. The technical test method according to claim 6, wherein said engine is a liquid-propellant rocket-engine.

8. The technical test method according to claim 7, wherein said liquid-propellant rocket-engine comprises a turbopump feed system.

9. An electronic control unit with at least one data input for receiving at least one operating parameter of a device and at least one data output for transmitting at least one operating setpoint to said device, said electronic control unit being configured to:

order an operating stage of the device corresponding to a stable value of said operating setpoint;

sample values of the at least one operating parameter over time;

calculate a measure of skewness of the sampled values for each operating parameter in a sampling window;

calculate a variance of the sampled values for each operating parameter in said sampling window during said operating stage;

filter the sampled values in order to obtain a filtered signal for each operating parameter;

calculate an absolute value of a time derivative of the filtered signal in said sampling window for each operating parameter;

calculate a variance of the time derivative of the filtered signal in said sampling window for each operating parameter; and change a value of said at least one operating setpoint when, for each operating parameter, at least one of the following conditions is satisfied:

the measure of skewness of the sampled values for the at least one operating parameter exceeds a predetermined upper threshold, the variance of the sampled values and the variance of the time derivative of the filtered signal for at least one operating parameter exceed respective predetermined upper thresholds, and the variance of the sampled values and the absolute value of the time derivative of the filtered signal are less than respective predetermined lower thresholds over a predetermined time duration.

* * * * *